Figure 1:
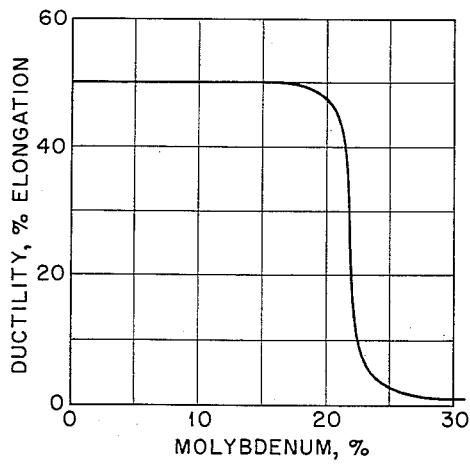

Jan. 19, 1960        H. INOUYE ET AL        2,921,850
NICKLE-BASE ALLOY
Filed March 3, 1958

INVENTORS
Henry Inouye
William D. Manly &
Thomas K. Roche
BY
Roland A. Anderson
ATTORNEY

United States Patent Office 2,921,850
Patented Jan. 19, 1960

2,921,850

NICKEL-BASE ALLOY

Henry Inouye, William D. Manly, and Thomas K. Roche, Oak Ridge, Tenn., assignors to the United States of America as represented by the United States Atomic Energy Commission Application March 3, 1958, Serial No. 718,928

6 Claims. (Cl. 75—171)

Our invention relates generally to novel nickel-base alloys and more particularly to nickel-base alloys having resistance to oxidation and salt corrosion simultaneously.

The metallurgy art in the last few years has made tremendous advances in the creation of new high-temperature, corrosion-resistant alloys for neutronic reactor and associated nuclear use. Materials which are used in the neutronic reactor art should, in many instances, display corrosion resistance to several media simultaneously, have high strengths, be readily formable into intricate geometric shapes, be capable of being welded and brazed easily, perform over wide temperature ranges, and have desirable nuclear characteristics under neutron irradiation. For example, the materials of construction used in the reactor disclosed in the application of the common assignee Serial No. 669,428, filed November 27, 1957, in the names of Arthur P. Fraas and Carroll B. Mills for "Neutronic Reactor," are subjected to corrosion by air, mixtures of fluoride salts, potassium, and sodium. In addition, the reactor operates over temperatures ranging from normal room temperature to 1600° F.

In the past, Inconel and Hastelloy, two popular, commercially available, nickel-base alloys, have been used for neutronic reactor applications. Each of these alloys has advantages over the other in certain environments. Inconel, for example, is susceptible to corrosion when used as a container material for fused salts but is an excellent material for use in air at high temperatures since it is resistant to oxidation. In addition, the Inconel alloy does not become brittle under use for extended periods of time at high temperatures (1300° F.–1600° F.). In contradistinction, Hastelloy B, for example, displays a tendency to embrittle at high temperatures, but is extremely resistant to corrosion when used as a material for containment of fused salts at high temperatures. Hastelloy B, however, is subject to oxidation when used in air at elevated temperatures. A superficial examination of the above-enumerated properties of these alloys will reveal that neither alloy has properties which could be considered ideal for incorporation into a fused-salt-fueled neutronic reactor. One will note that Inconel was selected as the best material available for the fused salt reactor of the above-identified application of the common assignee. Inconel was selected because of its non-susceptibility to embrittlement under reactor operating conditions, even though it is not the best corrosion resistant material for fused salt-mixtures.

In summary, it can be stated that no convenient material existed prior to our invention which was resistant to oxidation and fused salt corrosion simultaneously, and which did not embrittle under high temperature reactor service.

It is therefore, an object of our invention to provide novel alloys which are resistant to oxidation and fused salt corrosion simultaneously.

Another object of our invention is to provide novel alloys which are not subject to embrittlement when maintained at high temperatures for extended periods of time.

Another object of our invention is to provide novel alloys which are relatively easy to fabricate into intricate geometric shapes.

A further object of our invention is to provide novel alloys having mechanical strengths at least as high as the common nickel-base alloys of the prior art.

These and other objects of our invention will become apparent to those skilled in the art from the following description of our invention and the claims appended thereto.

In accordance with the principles of our invention, we provide a novel nickel-base alloy which comprises nickel together with 15–22 weight percent molybdenum, and a relatively minor amount of carbon. This basic alloy is non-ageing with respect to inter-metallic compound formation; therefore, it displays no tendency to embrittle. Its mechanical properties are equivalent to those of the nickel-base alloys of the prior art; and, in addition, it is extremely resistant to the corrosive influence of fused salts at high temperatures.

Figure 2:
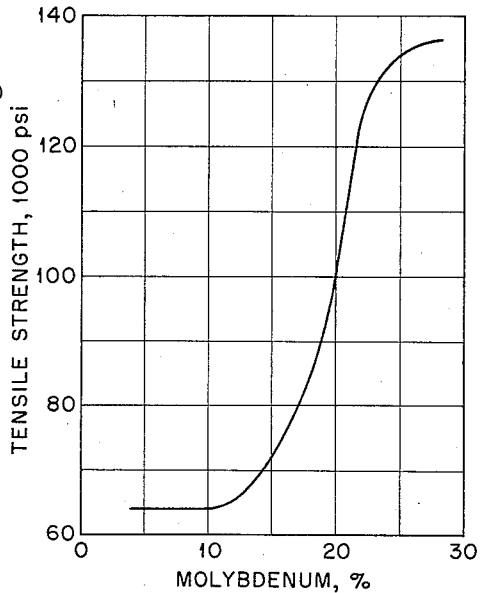

We have found that the concentration of molybdenum in our alloy is critical, in that alloys having a molybdenum concentration greater than approximately 22 percent embrittle under high temperature operating conditions, and alloys having less than approximately 15 percent molybdenum are insufficient in strength for most high temperature applications. Fig. 1 is a curve relating ductility, as expressed by percent elongation, to molybdenum concentration. The data from which Fig. 1 is plotted were obtained from binary nickel-molybdenum alloys which were aged at 1500° F. for 24 hours prior to testing at room temperature. Fig. 2 relates tensile strength of nickel-molybdenum alloys to molybdenum concentration. The data from which Fig. 2 is plotted were obtained at room temperature from samples which had been annealed at 2200° F. Additions of other strengthening agents would result in an upward shift of the curve of Fig. 2; therefore, the tensile data of Fig. 1 does not represent the highest strengths obtainable. We have found, however, that alloys containing less than approximately 15 percent molybdenum cannot be sufficiently strengthened by additions of other strengthening agents. Figs. 1 and 2, therefore, establish the range of molybdenum content at 15–22 weight percent. For most applications, however, it is preferred that the concentration be maintained between 16–18 percent.

Suitable carbon concentrations range from 0.02 to 0.5 weight percent. The exact amount of carbon present is dependent upon the properties that are desired. Compositions containing from 0.02–0.10 weight percent carbon can be successfully reduced to tubular products, such as piping and tubing, by cold working. Compositions which contain from 0.10–0.30 weight percent carbon are preferred for the fabrication of bars, plates, or sheet by cold or hot working, and compositions which contain from 0.30 to 0.50 weight percent carbon are suitable for the preparation of castings.

Figure 3:
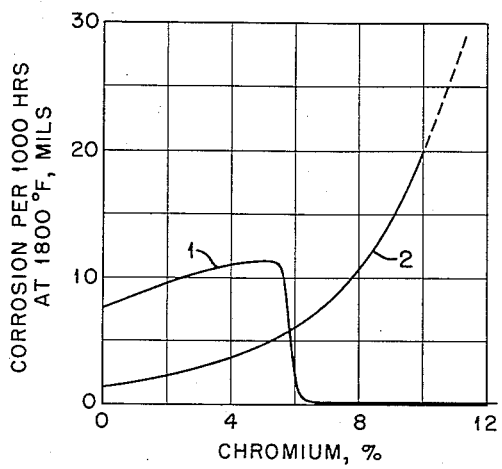

Although our alloy derives most of its strength and resistance to corrosion from the three constituents described above, many modifications of our basic alloy may be prepared by adding relatively minor proportions of other elements, thereby effecting changes in the physical properties manifested by the composition. For example, when chromium is added and made a part of our alloy, changes in its corrosion resistance are effected. Referring to Fig. 3, which displays oxidation (curve 1) and fused salt corrosion (curve 2) as a function of chromium content at 1800° F., it is apparent from curve 1 that the resistance of our alloy to oxidation is drastically affected by chromium content as the chromium concentration is elevated through the 5–6 percent range. It is also evident from curve 2 that an increase in chromium content increases the corrosion caused by fused salts.

Since corrosion properties of our alloy are so strongly dependent upon chromium content, it is extremely important that the selection of a concentration be carefully made. The corrosive environment into which our alloy will be placed will be a guiding factor in that selection. For alloys which will be subjected to fused salt corrosion only, a chromium concentration ranging from 0 to approximately 8 weight percent will be suitable. It is, however, preferable that the concentration be maintained at a minimum. For alloys which will be subjected to oxidation only, or to oxidation and fused salt corrosion simultaneously, suitable chromium concentrations range from approximately 6 to approximately 8 weight percent. When the chromium content substantially exceeds approximately 8 percent, other physical properties of the alloy are adversely affected.

The known strengthening agents of groups V-A and VI-A of the periodic table are useful when incorporated into our basic alloy. Additions of tungsten ranging from 0–4 weight percent are suitable and minor additions of this material will increase the strength of the alloy appreciably. In an analogous manner, 0–4 weight per cent additions of niobium (columbium), vanadium, and tantalum are suitable for use in our basic alloy. Any individual addition or combined addition of these four elements is satisfactory for incorporation in our composition. These additions may be made without causing embrittlement in the resulting alloy.

Moreover, it is preferred to add minor quantities of standard desulfurizers, deoxidizing agents and malleableizers to our alloy during its preparation. Aluminum, titanium, silicon and calcium-silicon are suitable for use as deoxidizers. Manganese is suitable for use as a malleableizer, and magnesium is suitable as a desulfurizer. Other agents of this type will be obvious to those skilled in the art.

The presence of minor amounts of iron in our alloy does not drastically affect its properties and can, therefore, be tolerated. This feature is extremely advantageous in that additions of chromium, tungsten, vanadium, niobium and tantalum can be made in the form of ferro-alloys rather than in the more expensive elemental state. Concentrations of iron less than 6 weight percent are tolerable. It will be noted that iron was intentionally added in Example I below. This addition was made merely to simulate the effect of any iron which may be included in the commercial form of our alloy as a result of ferro-alloy additions.

As indicative of one suitable composition, of a suitable method for the preparation of this alloy, and of the properties of the resulting alloy, the following example is offered.

EXAMPLE I

Alloy preparation

Approximately 0.1 lb. of carbon, 68.5 lb. of nickel, and 2.5 lb. of iron were charged into a rammed MgO crucible. The charge was heated to 2800° F., thereby melting the contents of the crucible, and 16.5 lb. of molybdenum, 7.5 lb. of chromium, 3.6 lb. of ferro-columbium (70% columbium) were added in that order. After these additions were completely dissolved, 0.3 lb. CaSi, 0.1 lb. NiMg (15% mg), 0.1 lb. Zr, and 0.1 lb. Ti were added as deoxidizers and desulfurizers. The melt was then heated to 2930–2950° F., and 0.7 lb. manganese, was added to malleableize the resultant product. Pouring at 2850–2870° F. resulted in approximately 100 lb. of alloy having suitable properties for high temperature neutronic reactor service as will be illustrated by the following:

Fabricability

A portion of the alloy produced as described above was press-forged from a 15 inch diameter ingot to a 9½ inch diameter bar at temperatures of 1800–2200° F. The resultant bar was inspected using the ultrasonic technique and was found to be sound.

A cylindrical billet 9½ inches in diameter and 15 inches in length was extruded at 2100° F. to a tube shell which was subsequently tube-reduced and drawn at room temperature to tubing of small diameter. At 50% reduction in area during the above cold working, the alloy was annealed at 2200° F. The resultant tubing proved to be free of defects upon examination.

Test plates of the alloy were heliarc welded without evidence of cracking, porosity, or microfissuring. Tensile and bend tests revealed that the weld was equivalent to the parent metal. In addition, the alloy was brazed with commercial brazing alloys such as "Nicrobraz" and Coast Metal No. 52 with no difficulty.

Oxidation resistance

A portion of the alloy produced as described above was heated in static air to temperatures in excess of 1800° F. and maintained at these temperatures for 168 hours. An examination of the tested piece revealed that the oxidation attack was less than 0.0005" as compared to 0.0025" for samples of Hastelloy B under similar conditions.

Stress rupture

The alloy prepared as described above was tested at 1500° F., 1650° F., and 1800° F. in atmospheres of argon and in fused fluoride salts. The results were as follows:

| Test Temperature (° F.) | Stress (p.s.i.) | Rupture Life (hours) | Elongation (percent) |
| --- | --- | --- | --- |
| 1,500 | 10,000 | 250 | 25 |
|  | 8,000 | 1,200 | 35 |
| 1,650 | 5,000 | 275 | 10 |
| 1,800 | 3,000 | 132 | 7 |

Salt corrosion resistance

A portion of the alloy produced as described above was incorporated into a thermal convection loop and exposed to a fused fluoride salt mixture at 1500° F. for 1000 hours. The salt composition was as follows: NaF—11.2 mol percent; KF—21 mol percent; LiF—45.3 mol percent; and $UF_4$—2.5 mol percent. An examination of the exposed material revealed on attack of 0.001"–0.002" as compared to approximately 0.007" for samples of Inconel under similar conditions.

Aging

A portion of the alloy produced as described above was annealed at 2100° F. and then aged at 1300° F. for 1000 hours. No embrittlement was detected in the resultant product. For example, at room temperature it was found that the yield point was 46,000–47,000 p.s.i., the ultimate strength was 114,000–130,000 p.s.i., and the elongation was 47–51 percent. At 1300° F., these values were 31,000–32,000 p.s.i., 63,000–73,000 p.s.i., and 13–21 percent, respectively.

It is to be understood that while the preceding example and discussion thereof are related to a preferred form of our alloy, many deviations from and modifications of this preferred form may be made within the scope and spirit of our invention. Accordingly, our invention should be limited only as indicated in the following claims.

Having thus described our invention, we claim:

1. A nickel-base alloy which comprises essentially 15 to 22 weight percent molybdenum, a relatively minor amount of carbon, and 6 to 8 weight percent chromium, the balance being nickel.

2. A nickel-base alloy which comprises essentially 15 to 22 weight percent molybdenum, a relatively minor amount of carbon, 6 to 8 weight percent chromium, and up to 4 weight percent of at least one additional strengthening agent selected from the group V-A and VI-A elements consisting of tungsten, tantalum, vanadium, and niobium, the balance being nickel.

3. The alloy of claim 2 wherein the strengthening agent is niobium.

4. The alloy of claim 2 wherein the strengthening agents are vanadium and tungsten.

5. A nickel-base alloy consisting essentially of 16 to 18 weight percent molybdenum, .02 to 0.5 weight percent carbon, 6 to 8 weight percent chromium, and up to 4 weight percent of at least one strengthening agent selected from the group V-A and VI-A elements consisting of tungsten, tantalum, vanadium, and niobium, the balance being nickel.

6. The alloy of claim 5 wherein the strengthening agent is niobium.

References Cited in the file of this patent
UNITED STATES PATENTS

| | | |
|---|---|---|
| 1,924,245 | Koster | Aug. 29, 1933 |
| 2,100,218 | Kelley | Nov. 23, 1937 |
| 2,219,445 | Franks | Oct. 29, 1940 |